(12) United States Patent
Hübner

(10) Patent No.: US 12,037,975 B2
(45) Date of Patent: Jul. 16, 2024

(54) FRANCIS-TYPE HYDRAULIC MACHINE

(71) Applicant: Voith Patent GmbH, Heidenheim (DE)

(72) Inventor: Björn Hübner, Ulm (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 18/356,077

(22) Filed: Jul. 20, 2023

(65) Prior Publication Data
US 2023/0358201 A1 Nov. 9, 2023

Related U.S. Application Data

(63) Continuation of application No. PCT/EP2021/080881, filed on Nov. 8, 2021.

(30) Foreign Application Priority Data

Jan. 21, 2021 (DE) ..................... 10 2021 101 197.3

(51) Int. Cl.
*F03B 3/12* (2006.01)
*F03B 11/04* (2006.01)

(52) U.S. Cl.
CPC .............. *F03B 3/125* (2013.01); *F03B 11/04* (2013.01)

(58) Field of Classification Search
CPC ................................. F03B 3/125; F03B 11/04
See application file for complete search history.

(56) References Cited

U.S. PATENT DOCUMENTS

| | | |
|---|---|---|
| 4,568,241 A | 2/1986 | Kubota |
| 2018/0023534 A1 | 1/2018 | Martinez et al. |

FOREIGN PATENT DOCUMENTS

| | | |
|---|---|---|
| EP | 0 039 459 A1 | 4/1981 |
| JP | 58-118273 A | 7/1983 |

OTHER PUBLICATIONS

Notification of the Transmission of the International Search Report and Written Opinion of the International Search Authority or Declaration dated Mar. 4, 2022 for International Application No. PCT/EP2021/080881 (14 pages).
"Noise reduction at Dinorwig power station", Teck K. Tee et al., HYDRO 01, 2001 pp. 259-268 (10 pages).
"The sound of silence", Robert Date, International Water Power & Dam Construction, Jul. 1998 (3 pages).
"Hydraulic Machinery and Cavitation", Dordrecht, Springer Netherlands, Retrieved from the Internet: https://infoscience.epfl .ch/record/58861 /files/Francis%20Turbine%20Surge%20:%20Discussion%20and%20Data%20Base.pdf, Jan. 1, 1996, pp. 855-864 (10 pages).

*Primary Examiner* — Brian O Peters
(74) *Attorney, Agent, or Firm* — Taylor IP, P.C.

(57) ABSTRACT

A hydraulic machine of the Francis-type includes: an impeller with blades; a guide vane assembly with a ring of guide vanes, a vane-free space extending between the impeller and the guide vane assembly; and at least three resonators for suppressing pressure fluctuations, the resonators respectively including a chamber and a tube connector, the tube connector being connected to the chamber, the tube connector including an end that faces away from the chamber and that opens into the vane-free space, the resonators being configured for suppressing the pressure fluctuations occurring during the operation of the hydraulic machine, the resonators being arranged at a uniform distance from each other in a circumferential direction around the impeller, and the resonators being adjusted to a resonant frequency which is one and the same relative to one another.

6 Claims, 5 Drawing Sheets

STATE OF THE ART

FRANCIS-TYPE HYDRAULIC MACHINE

CROSS REFERENCE TO RELATED APPLICATIONS

This is a continuation of PCT application no. PCT/EP2021/080881, entitled "FRANCIS-TYPE HYDRAULIC MACHINE", filed Nov. 8, 2021, which is incorporated herein by reference. PCT application no. PCT/EP2021/080881 claims priority to German patent application no. 10 2021 101 197.3, filed Jan. 21, 2021, which is incorporated herein by reference.

BACKGROUND OF THE INVENTION

1. Field of the Invention

The present invention relates to hydraulic machines, and, more particularly, to Francis-type hydraulic machines.

2. Description of the Related Art

Hydraulic machines of this type include an impeller and a guide vane assembly. The impeller is herein assigned to the rotating system and the guide vane assembly is assigned to the stationary system. The impeller includes a plurality of rotor blades. In turbines or pump turbines, the guide vane assembly includes two concentrically arranged rings of guide vanes, wherein the inner ring includes movably mounted guide vanes and the outer ring includes stationary guide vanes. The stationary guide vanes are often also referred to as traverses. In pure pumps, the guide vane assembly includes only one ring of stationary guide vanes. When a flow passes through the hydraulic machine and the impeller rotates, pressure fluctuations can occur due to the interaction of the flow around stationary guide vanes and rotating impeller blades (in other words, due to rotor-stator interaction). Pressure fluctuations usually occur only with selected frequencies which result from the speed and the blade combination. The pressure fluctuations propagate in the direction of the impeller and spiral housing which connects externally to the guide vane assembly and can thereby be amplified by hydroacoustic resonance effects (that is, partial standing waves). The pressure fluctuations described herein can lead to unacceptable increased vibrations and associated noise emissions, especially if the pressure fluctuations propagate into the pressure pipeline.

The following countermeasures have become known in the current state of the art. "Teck K. Tee: discloses: "Noise reduction at Dinorwig power station, HYDRO 01, 2001" discloses a so-called "hydraulic silencer". This is a hollow space integrated into the wall of the spiral housing which is connected via a plurality of openings with the interior of the spiral housing. An airbag is arranged inside the hollow space. "Robert Date: The sound of silence, International Water Power & Dam Construction, 1998" discloses a Helmholtz resonator which is arranged on the spiral housing. The resonator consists of a chamber which is connected with the spiral housing by a tube connector. The frequency of the resonator can be varied by way of a movable sleeve, which can be used to change the effective length of the tube connector.

EP 0039459 A1 discloses the use of multiple resonators arranged side-by-side, wherein each resonator is syntonized to a different frequency. For example, one resonator may be syntonized to the fundamental frequency and the other resonators may be syntonized to harmonics of the fundamental frequency.

What is needed in the art is an alternative arrangement with which the pressure fluctuations described can be effectively reduced in hydraulic machines of the type described.

SUMMARY OF THE INVENTION

The invention relates to a Francis-type hydraulic machine with an impeller. The invention relates to the prevention of pressure fluctuations which can occur during the operation of the hydraulic machine. The hydraulic machine can be a turbine or a pump, or a pump turbine.

The present invention provides a hydraulic machine of the Francis type including an impeller and a guide vane assembly, wherein the impeller includes a plurality of impeller blades, and the guide vane assembly includes at least one ring of guide vanes, and wherein a vane free space extends between the impeller and the guide vane assembly, wherein the hydraulic machine includes at least three resonators for suppressing pressure fluctuations which may occur during operation of the hydraulic machine, and wherein each resonator includes a chamber and a tube connector, and wherein in each case the tube connector is connected to the associated chamber, and wherein in each case the end of the tube connector facing away from the chamber opens into the vane free space, and wherein resonators are designed so that they can suppress pressure fluctuations occurring during operation of the hydraulic machine, characterized in that the resonators are arranged at uniform distances from each other in the circumferential direction around the impeller, and wherein all resonators are adjusted to one and the same resonant frequency.

Further, optionally, an adjustable piston is arranged in each of the chambers, wherein the piston is designed such that by changing the position of the piston the effective volume of the respective chamber can be changed in order to adjust the resonant frequency of the respective resonator.

Further, optionally, the number of resonators is determined in that the number of resonators multiplied with a natural number provides the number of guide vanes.

Further, optionally, the number of resonators is determined in that the number of guide vanes multiplied with a natural number provides the number of resonators.

Further, optionally, the guide vane assembly includes a ring of fixed guide vanes.

Further, optionally, the guide vane assembly includes a ring of movable guide vanes.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
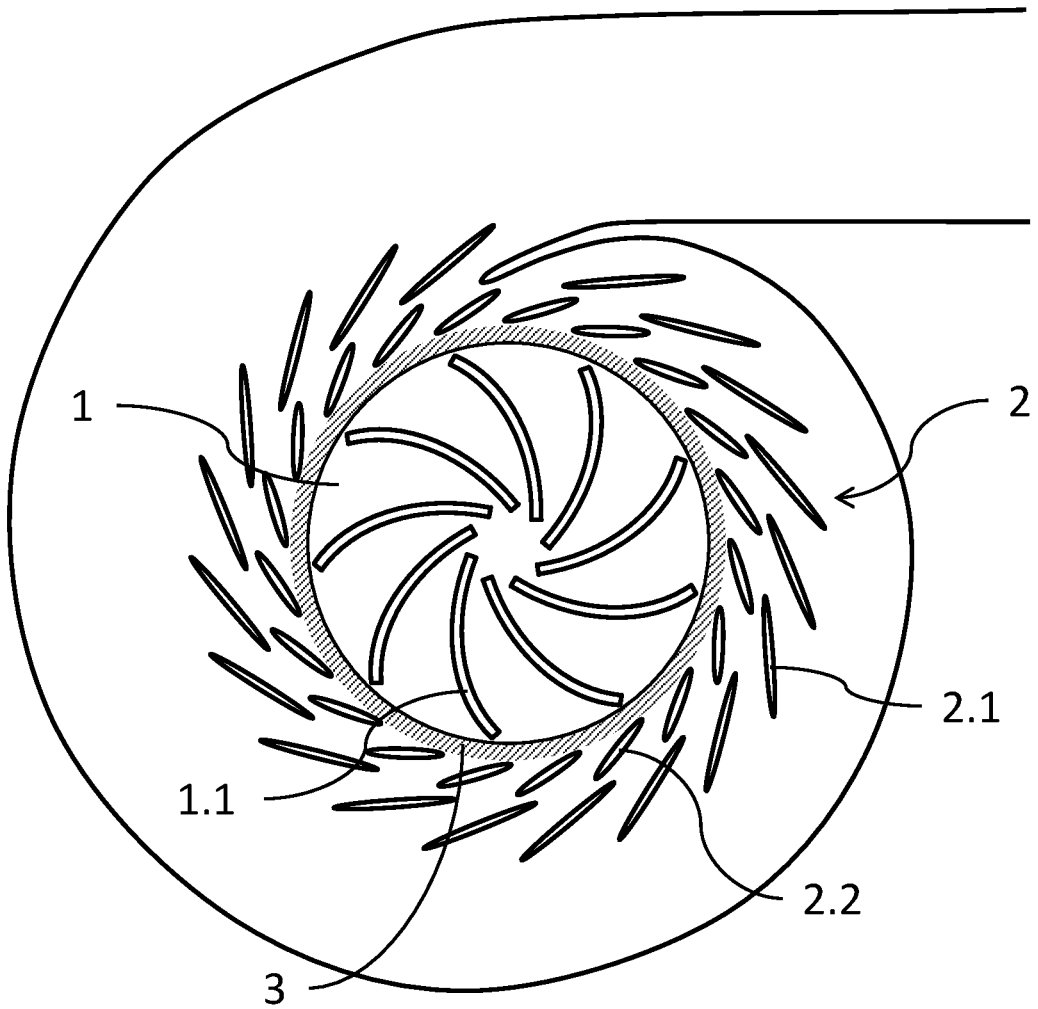
FIG. 1 is a generic hydraulic machine of the Francis type.

FIG. 1 is a schematic diagram of a Francis-type hydraulic machine. The hydraulic machine includes an impeller which is identified with 1, and a guide vane assembly which is identified with 2. The direction of view of FIG. 1 coincides with the axis of rotation of the impeller. Impeller 1 includes a plurality of vanes, one of which is identified with 1.1. Guide vane assembly 2 includes a ring of stationary guide vanes, one of which is identified with 2.1. Stationary guide vanes 2.1 are often also referred to as traverses. Guide vane assembly 2 further includes a ring of movable guide vanes, one of which is identified with 2.2. The configuration of movable guide vanes 2.2 illustrated in FIG. 1 is generally used for turbines and pump turbines. If the hydraulic machine is purely a pump, the ring with movable guide vanes 2.2 is omitted and is thus to be considered as optional. In the view shown in FIG. 1, guide vane assembly 2 surrounds impeller 1. The so-called vane free space, which is shown hatched in FIG. 1 and which is identified with 3, extends between guide vane assembly 2 and the impeller. If guide vane assembly 2 includes movable guide vanes 2.2, then the outer boundary of vane free space 3 is formed by a cylinder jacket which contacts but does not intersect with movable guide vanes 2.2 when they are in a position in which they come as close as possible to impeller 1. This is the so-called open position of the guide vane assembly. If guide vane assembly 2 does not include movable guide vanes 2.2, then the outer boundary of vane free space 3 is formed by a cylinder jacket which makes contact with, but does not intersect stationary guide vanes 2.1. The inner boundary of vane free space 3 is formed by a cylinder jacket which makes contact with, but does not intersect impeller 1. Thus, vane free space 3 thus basically represents a tubular cylinder, wherein impeller 1 is located inside the tubular cylinder, and guide vane assembly 2 extends outside the tubular cylinder.

Figure 2:
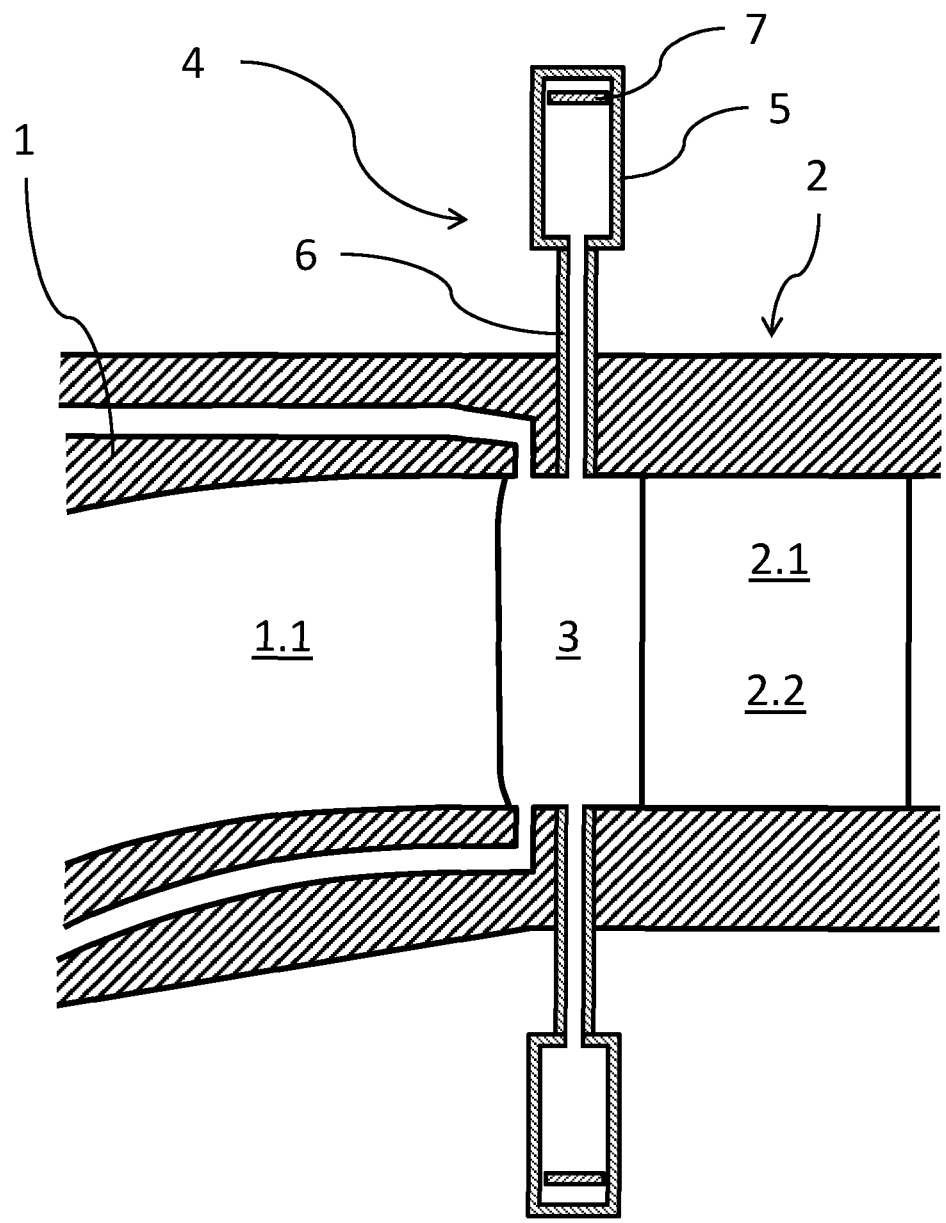
FIG. 2 is a detail of a hydraulic machine according to the present invention.

FIG. 2 shows a detailed schematic view of a hydraulic machine according to the present invention. The sectional plane of FIG. 2 is parallel to the axis of rotation of impeller 1. The identifications correspond to those in FIG. 1. It is clear from FIG. 2 that the axial boundaries of vane free space 3 are given by the boundaries of the waterway which allows water to flow through the hydraulic machine during its operation. During operation of the turbine the water flows from guide vane assembly 2 towards impeller 1 and flows in the opposite direction during pump operation. A hydraulic machine according to the present invention includes resonators to suppress pressure fluctuations, one of which is identified with 4 in FIG. 2. Each resonator 4 includes a chamber, which is identified with 5, and a tube connector, which is identified with 6. Tube connector 6 is connected to chamber 5 and arranged in such a way that the end of tube connector 6 facing away from chamber 5 opens into the waterway in vane free space 3. This ensures that during operation of the hydraulic machine chambers 5 of resonators 4 are filled with water and connected to the waterway via tube connectors 6. In other words, tube connectors 6 are thus also filled with water.

Resonators 4 are to be designed in such a way that they can suppress the undesired pressure fluctuations. For this purpose, the internal dimensions of chambers 5 and tube connectors 6 are to be selected so that the hydroacoustic resonant frequency of resonators 4 is close to the frequency at which the undesirable pressure fluctuations occur. Since the pressure fluctuations are caused by the rotor-stator interaction, they may be the first, second or third harmonic of the rotor blade passing frequency, depending on the application and blade combination (i.e., number of impeller blades and guide vanes). Since it is often not possible to predict the resonator characteristics with sufficient accuracy through calculation, and since temperature fluctuations can also be responsible for an influence that is not insignificant, it is advantageous if resonators 4 have an adjustment device which allows both initial tuning and readjustment of the resonant frequency of resonators 4 during operation. For this purpose, it is envisaged to arrange an adjustable plunger in chambers 5, whose position can be precisely adjusted, for example by way of a spindle or other device. In FIG. 2, one of the pistons is identified with 7. By adjusting piston 7, the effective chamber volume and thus the resonant frequency of respective resonators 4 can be set. The wall thicknesses of resonators 4 which can be manufactured of steel are to be selected in such a way that the application-related static pressures and dynamic pressure fluctuations, which are sometimes very high, can be safely absorbed.

Resonators 4 can be arranged on both sides of the waterway. In FIG. 2, one of the resonators 4 is arranged on the upper side, and an additional resonator 4 is arranged on the lower side. However, all resonators 4 could also be arranged at the top, or all resonators could be arranged at the bottom. FIG. 2 shows a hydraulic machine with a vertical axis of rotation. In hydraulic machines which have a horizontal axis of rotation, the arrangement shown in FIG. 2 would be rotated by 90°. In hydraulic machines equipped with a guide vane assembly with movable guide vanes 2.2, one of the sides of the waterway is heavily dominated by the adjustment mechanism for movable guide vanes 2.2. In that case it is usually advantageous if all resonators 4 are arranged on the opposite side of the waterway.

Figure 3:
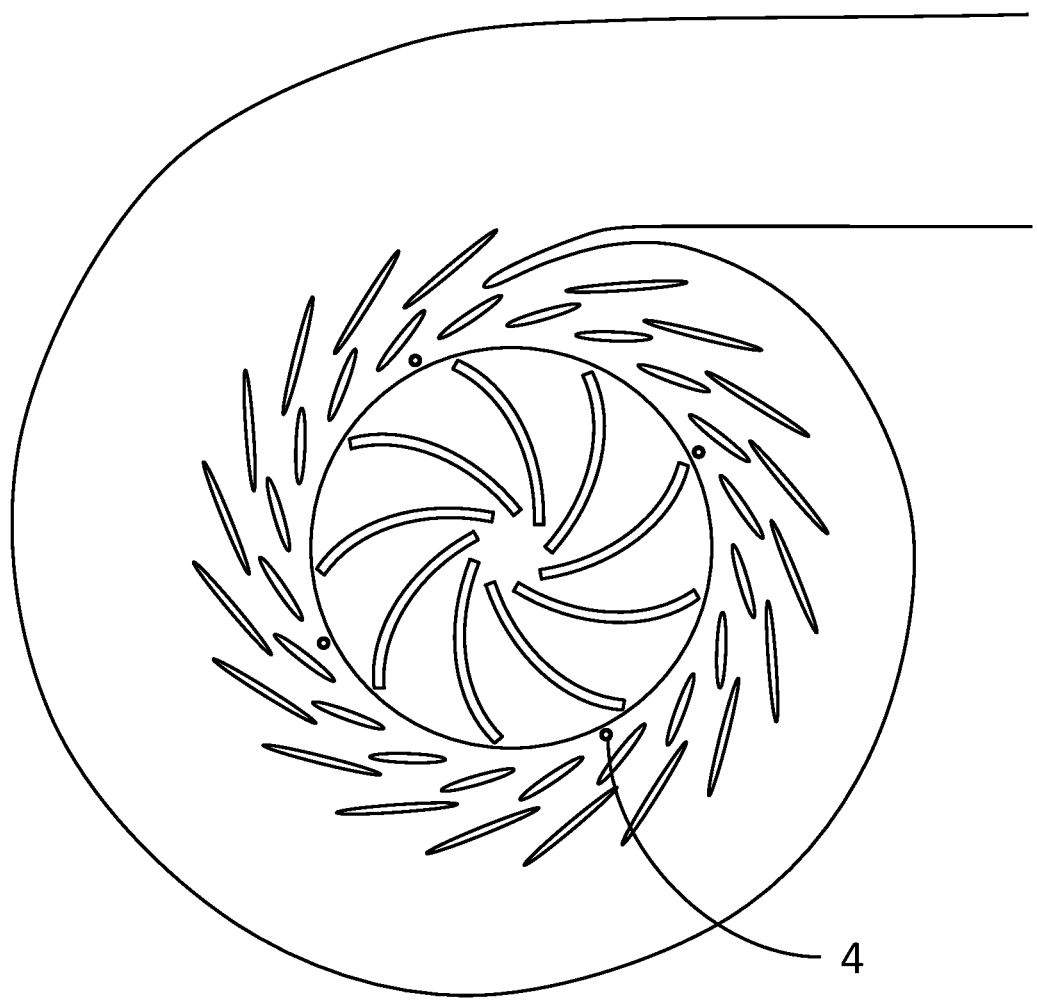
FIG. 3 is a hydraulic machine according to the present invention in a first embodiment.
Figure 4:
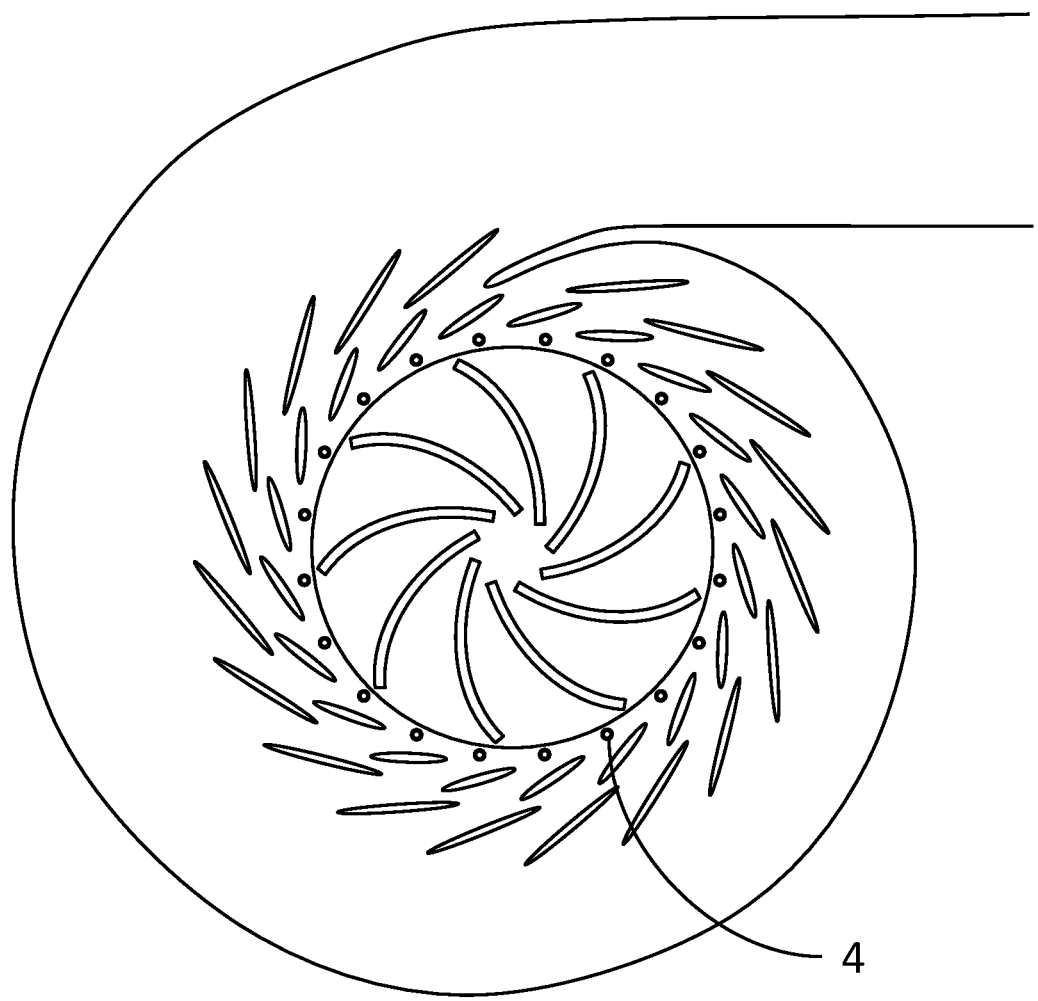
FIG. 4 is a hydraulic machine according to the present invention in a second embodiment.
Figure 5:
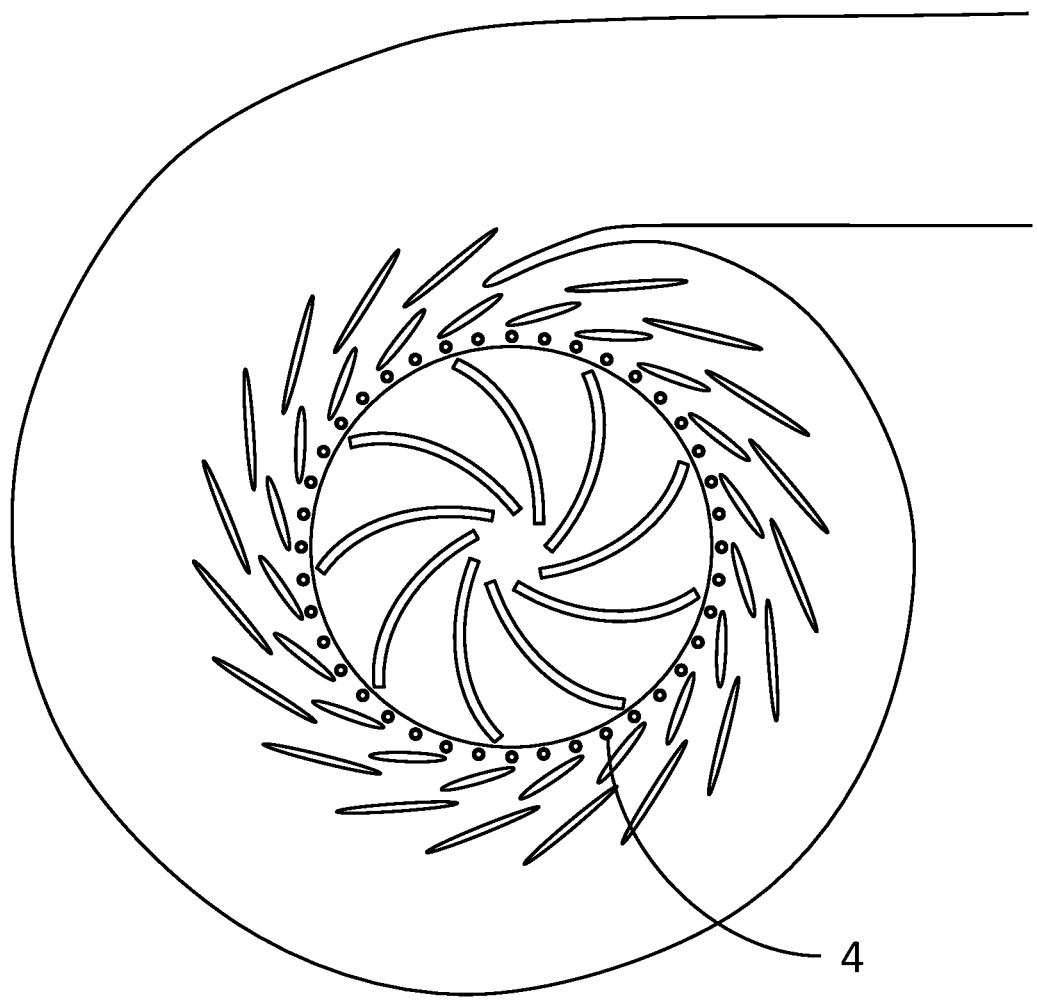
FIG. 5 is a hydraulic machine according to the present invention in a third embodiment.

FIG. 3 shows a hydraulic machine according to the present invention with an arrangement of resonators 4 in a first embodiment. The hydraulic machine includes four resonators 4 which are arranged in the vane free space in such a way that they can prevent the propagation of vibrations in all directions around the impeller. For this purpose, resonators 4 are evenly spaced in circumferential direction around the impeller. The hydraulic machine shown in FIG. 4 includes 20 movable guide vanes. Resonators 4 are distributed in such a way that one resonator 4 is arranged at every fifth guide vane. Resonators 4 are therein arranged approximately centrally, in other words centrally relative to the profile of the associated guide vane. They could just as easily be arranged more in the direction of the particular end of the associated guide vane which is located closer to the impeller. They could just as easily be arranged more in the direction of the particular end of the associated guide vane which is located further away from the impeller. An additional uniform distribution of resonators 4 results in the illustrated example of the hydraulic machine if a total of five resonators 4 are used, wherein one resonator 4 is arranged at each fourth guide vane. Another uniform distribution of resonators 4 results in the example of the illustrated hydraulic machine when a total of ten resonators 4 are used, one resonator 4 being arranged at each second guide vane. Another uniform distribution of resonators 4 results in the example of the illustrated hydraulic machine when a total of twenty resonators 4 are used, one resonator 4 being arranged at each guide vane. This arrangement is shown in FIG. 4. In the example of the hydraulic machine shown, a further uniform distribution of resonators 4 results if a total of forty resonators 4 are used, with two resonators 4 being arranged at each guide vane. This arrangement is illustrated in FIG. 5.

An expert can easily derive a suitable uniform distribution of resonators 4 for any particular hydraulic machine (in other words, for any given number of guide vanes 2.1 or 2.2) from the previously provided examples. As mentioned above, the absolute azimuthal orientation of the arrangement of resonators 4 with respect to the adjacent guide vanes can be chosen arbitrarily.

Another possible deviation from resonators 4 that are evenly distributed around the impeller is obtained by starting with the number of impeller blades 1.1. The hydraulic machine shown in FIGS. 3-5 includes nine impeller blades 1.1. For example, three, nine or eighteen resonators could be evenly spaced around the impeller. Again, the azimuthal orientation does not matter.

However, the use of a uniform distribution of resonators 4 around the impeller is not limited to deviation from the number of guide vanes or impeller blades. For example, an arrangement could be chosen which includes seven, eight, eleven, thirteen, etc. resonators 4. Again, the azimuthal orientation does not matter.

According to the present invention, all resonators 4 are set to one and the same resonant frequency.

Investigations conducted by the inventor have shown that a greater number of resonators 4 also facilitates better suppression of vibrations. In addition, those arrangements which—in deriving the number of resonators 4—were oriented on the number of guide vanes were particularly advantageous in this respect. In the interests of economy, the expert will strive to get by with as few resonators 4 as possible in order to dampen the vibrations to a sufficient extent. For this purpose the expert will—within the scope of the technical teachings of this application—determine the number and arrangement of resonators 4 necessary by way of hydroacoustic simulation calculations.

In conclusion it should be mentioned that the technical teaching of this application is of course also suitable for retrofitting already existing hydraulic machines with appropriately arranged resonators 4 in order to improve the vibration behavior of these machines.

COMPONENT IDENTIFICATION LISTING

1 Impeller
1.1 impeller blade
2 guide vane assembly
2.1 stationary guide vane (traverse)
2.2 movable guide vane
3 vane free space
4 resonator
5 chamber
6 tube connector
7 piston
8 spiral housing
9 pressure pipeline While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A hydraulic machine of the Francis-type, the hydraulic machine comprising:
   an impeller, which includes a plurality of impeller blades;
   a guide vane assembly, which includes at least one ring of guide vanes, a vane-free space of the hydraulic machine extending between the impeller and the guide vane assembly; and
   at least three resonators configured for suppressing a plurality of pressure fluctuations which may occur during an operation of the hydraulic machine, each one of the at least three resonators respectively including a chamber and a tube connector, in each case of the at least three resonators the tube connector being connected to the chamber, in each case of the at least three resonators the tube connector including an end that faces away from the chamber and that opens into the vane-free space, the at least three resonators being configured for suppressing the plurality of pressure fluctuations occurring during the operation of the hydraulic machine, the at least three resonators being arranged at a uniform distance respectively from each other in a circumferential direction around the impeller, and the at least three resonators being adjusted to a resonant frequency which is one and the same relative to one another.

2. A hydraulic machine according to claim 1, wherein each of the at least three resonators respectively includes a piston which is adjustable, is in each case arranged in the chamber, and is configured such that by changing a position of the piston an effective volume of the chamber is changed in order to adjust the resonant frequency of a respective one of the at least three resonators.

3. A hydraulic machine according to claim 1, wherein a number of the resonators is determined such that the number of the resonators multiplied by a natural number provides a number of the guide vanes.

4. A hydraulic machine according to claim 1, wherein a number of the resonators is determined such that the number of the guide vanes multiplied by a natural number provides the number of the resonators.

5. A hydraulic machine according to claim 1, wherein the at least one ring of guide vanes includes a ring of fixed guide vanes.

6. A hydraulic machine according to claim 1, wherein the at least one ring of guide vanes includes a ring of movable guide vanes.

* * * * *